UNITED STATES PATENT OFFICE.

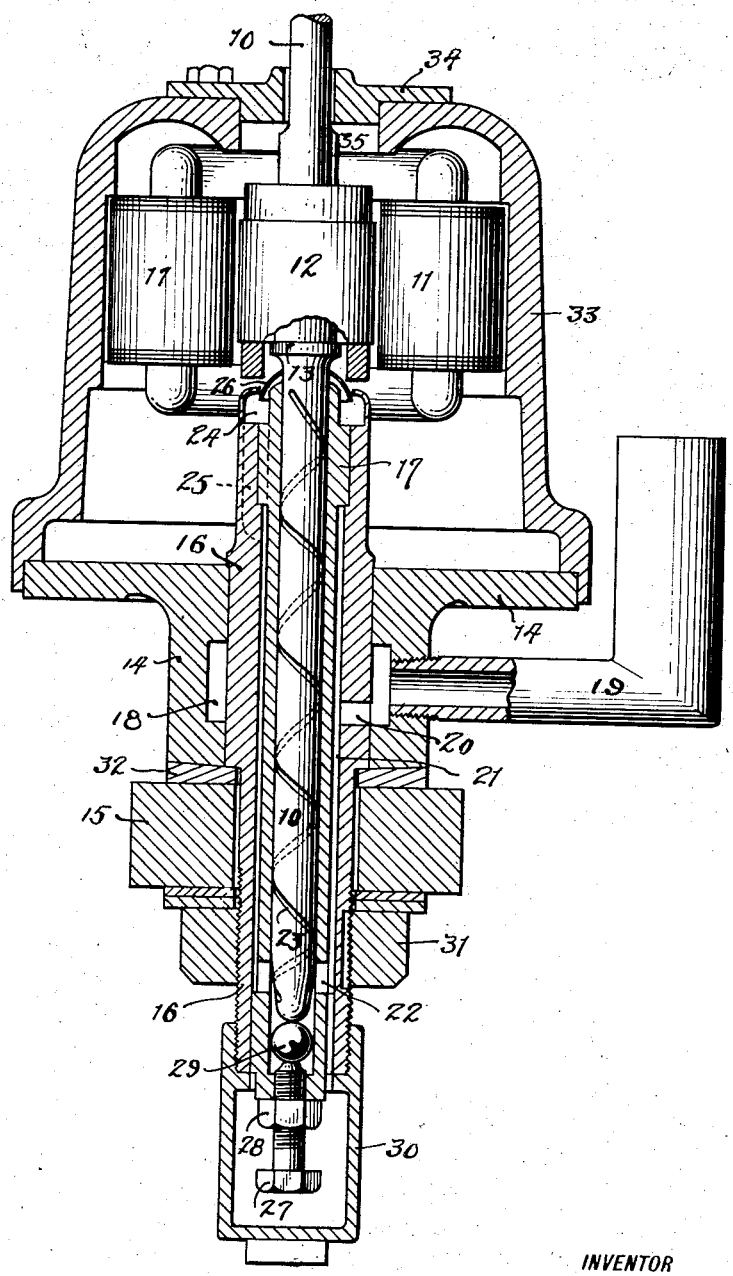

JAMES CLAYTON, OF COVENTRY, ENGLAND, ASSIGNOR TO COURTAULDS, LIMITED, OF LONDON, ENGLAND.

SPINDLE-BEARING.

1,363,087.  Specification of Letters Patent.  Patented Dec. 21, 1920.

Application filed October 8, 1917. Serial No. 195,420.

*To all whom it may concern:*

Be it known that I, JAMES CLAYTON, a subject of the King of Great Britain, residing at 12 Middleborough road, Coventry, England, have invented certain new and useful Improvements in Spindle-Bearings, of which the following is a specification.

My invention relates to spindle bearings and particularly to bearings for electrically driven spinning spindles, the object of my invention being to provide a spindle bearing of such construction that the lubricating oil cannot reach the windings of the motor.

The accompanying drawing shows a vertical section through a spindle in which my invention is embodied in one form.

The present invention relates to spindles supported in vertical position, such as those commonly used in spinning machines, and that shown in the accompanying drawing is adapted for a machine for spinning artificial silk and employing a spinning box, (not shown) supported at the upper end of the spindle 10. In the constructions now generally employed for spindles of this type where they are driven by electric motor, there are bearings both above and below the motor windings 11. Incident to this construction is the constant danger that the lubricating oil for the bearings will find its way into the motor and damage the latter. The object of the present invention is to provide a bearing for the spindle located wholly below the windings, so that the lubricating oil cannot reach the latter.

As here shown, the spindle 10 is fast with the motor commutator 12, supported by shoulder 13 on the spindle. The spindle bearing comprises a base 14, resting upon the spindle rail 15, and fitted with a vertical sleeve 16. Within the latter, and supported thereby, is the long tubular bearing 17 for the lower end of the spindle 10. The base 14 is reamed out to afford an oil chamber 18, to which opens the pipe 19 from an oil cup (not shown). The passage 20 through the sleeve 16 opens to an annular channel 21 formed between the interior of the sleeve 16 and the reduced mid-area of the tubular bearing 17. This channel 21 communicates at its lower end, through perforations 22, with the interior of the bearing 17, and the oil is circulated upward therefrom through the spiral groove 23, cut in the outer surface of the spindle, to the upper end of the bearing. A chamber 24 is reamed out of the sleeve 16 at its upper end to form a collecting chamber which communicates, through passage 25, with the channel 21 surrounding the tubular bearing 17, so that any oil escaping from the upper end of the bearing into said chamber, would be returned by gravity through the channel 21 to the lower end of the bearing, and thus be circulated. A skirt 26 forced on the spindle just below the armature 12 extends downward into the chamber 24, and serves to return to the latter any oil which may creep above the bearing.

The bearing tube 17 is preferably closed at its lower end and tapped to receive the adjusting screw 27, held in position by the nut 28, and supporting on its coned and cupped upper end a ball 29 upon which the lower rounded end of the spindle rests. A housing 30 for the adjusting nut 28 may be screwed on to the tapped lower end of the sleeve 16. The latter is firmly held in position on the spindle rail 15 by the usual nut 31, and an adjusting washer 32 may be provided between the spindle rail and the base 14.

The motor and upper end of the bearing are housed in by a casing 33, resting upon the base 14, while a removable dust cap 34 surrounds the spindle and prevents the entry of dirt into the motor chamber and the upper end of the bearing. The aperture 35 in the top of the housing is preferably large enough to permit the spindle 10, with its armature 12, to be lifted out of the bearing sleeve without disturbing the housing 33.

It is obvious that the construction illustrated not only prevents the possibility of oil escaping from the bearing to the motor windings, but it also eliminates the bother of the upper bearing, while, at the same time, affording ample support for the spindle. So far as I am aware, I am the first to provide a bearing of any sort for electrically driven spindles in which these advantages are attained, and my invention is not limited to the specific form of construction shown and described. Various modifications may readily be made without departing from what I claim as my invention.

I claim:

1. A spinning spindle, an armature thereon, a housing surrounding the latter and centrally apertured to accommodate the spindle, the aperture being of sufficient diameter to permit the spindle and armature to be lifted out therethrough without disturbing the housing.

2. In combination with a construction such as specified in claim 1, a dust cap for said aperture centrally pierced to permit the spindle to pass freely therethrough.

3. A spinning spindle comprising a base adapted to rest upon a rail, a sleeve associated with said base and extending above and below the rail, a tubular bearing fitting within said sleeve, but channeled to afford an oil passage between said bearing and the sleeve, an oil collecting chamber at the top of the sleeve, a spindle journaled in the tubular bearing, an oil return skirt fitted on the spindle and discharging to said collecting chamber and an electric motor armature mounted on the spindle above the oil return skirt, substantially as described.

In testimony whereof I have signed my name to this specification.

JAMES CLAYTON.